(12) United States Patent
Tung

(10) Patent No.: US 7,293,923 B2
(45) Date of Patent: Nov. 13, 2007

(54) LASER MODULE FOR CIRCULAR SAW

(76) Inventor: Hsin Chih Tung, P.O. Box 26-757, Taipei 106 (TW)

( * ) Notice: Subject to any disclaimer, the term of this patent is extended or adjusted under 35 U.S.C. 154(b) by 3 days.

(21) Appl. No.: 11/471,526

(22) Filed: Jun. 21, 2006

(65) Prior Publication Data

US 2006/0233499 A1   Oct. 19, 2006

Related U.S. Application Data

(63) Continuation-in-part of application No. 10/779,115, filed on Feb. 13, 2004, now abandoned.

(51) Int. Cl.
*G02B 6/36* (2006.01)
(52) U.S. Cl. ......................... 385/93; 372/107
(58) Field of Classification Search .................. 385/93; 372/107
See application file for complete search history.

(56) References Cited

U.S. PATENT DOCUMENTS

| 4,541,689 | A | * | 9/1985 | Howard et al. ............. 359/825 |
| 5,621,203 | A | * | 4/1997 | Swartz et al. ........... 235/462.11 |
| 5,710,417 | A | * | 1/1998 | Joseph et al. .......... 235/462.11 |
| 7,143,943 | B2 | * | 12/2006 | Tsikos et al. .......... 235/462.01 |
| 7,187,494 | B2 | * | 3/2007 | Nishiwaki et al. .......... 359/388 |
| 2004/0218656 | A1 | * | 11/2004 | Wang et al. ................ 372/108 |

* cited by examiner

*Primary Examiner*—Ellen E. Kim
(74) *Attorney, Agent, or Firm*—Rosenberg, Klein & Lee

(57) ABSTRACT

A laser module used in a circular saw to guide cutting of the saw blade of the circular saw is constructed to have a hollow housing, a focal lens mounted in the housing, a laser diode mounted in the housing behind the focal lens and beyond the focus of the focal lens, a circuit board electrically connected to the laser diode, a focal lens mounted in the housing in front of the laser diode beyond the focus of said focal lens, an annular endpiece threaded into the front side of the housing to hold the focal lens and rotatable relative to the housing to move the focal lens axially relative to the laser diode and to further adjust the pattern the light spot of the laser beam from the laser diode on the workpiece.

14 Claims, 6 Drawing Sheets

LASER MODULE FOR CIRCULAR SAW

CROSS REFERENCE TO RELATED APPLICATION

This application is a continuation-in-part of U.S. application Ser. No. 10/779,115 filed on 13 Feb. 2004 and entitled "LASER MODULE FOR CIRCULAR SAW", now abandoned.

BACKGROUND OF THE INVENTION

1. Field of the Invention

The present invention relates to a circular saw and, more specifically, to a laser module for use in a circular saw to guide cutting of the saw blade accurately along the cut line on the workpiece.

2. Description of the Related Art

A circular saw can rapidly and neatly cut a workpiece. For the advantage of high cutting efficiency, circular saws are intensively used for cutting wooden materials. Regular circular saws include two types, the portable type and the bench type. When a portable type circular saw is used, the operator needs to move the saw blade against a workpiece that is fixed in position. When a bench type circular saw is used, the circular saw is stationary, and the operator needs to move the workpiece against the saw blade of the circular saw. A circular saw may be equipped with a laser structure to guide cutting of the saw blade along the cut line on the workpiece.

A conventional laser structure comprises a case, a laser module, and a power control and supply unit. The laser module and the power control and supply unit are mounted in the case and affixed to the center of the circular saw. The laser module is electrically connected to the power control and supply unit, and controlled by the power control and supply unit to emit laser light. During cutting operation of the circular saw, the focal lens of the laser module focuses the laser beam of the laser diode onto the cut line on the workpiece for enabling the saw blade of the circular saw to follow.

The aforesaid laser structure is still not satisfactory in function. Because the laser diode is within the focus of the focal lens, the laser beam forms a small laser light spot on the workpiece before cutting, and forms a narrow line of laser light during cutting. Because the line of laser light has a narrow width, the user may be unable to see the line of laser light on the workpiece during cutting operation.

Therefore, it is desirable to provide a laser module for a circular saw that eliminates the aforesaid problem.

SUMMARY OF THE INVENTION

The present invention has been accomplished under the circumstances in view. It is the main object of the present invention to provide a laser module for circular saw, which produces a laser beam that forms a big light spot on the workpiece before cutting with the circular saw and to form a strip of light on the workpiece during cutting with the circular saw, guiding the operator to move the saw blade accurately along the cut line on the workpiece.

To achieve this and other objects of the present invention, the laser module is used in a circular saw and mounted in the middle of the saw blade to guide cutting of the saw blade of the circular saw. The laser module comprises a hollow housing, a laser diode mounted in the housing, a circuit board electrically connected to the laser diode, and a focal lens mounted adjustably in the housing in front of the laser diode to be offset by an adjustable axial displacement therefrom, said laser diode remaining during operation beyond a focus of said focal lens, and in such a position that the laser diode is beyond the focus of the focal lens.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENT

Figure 1:
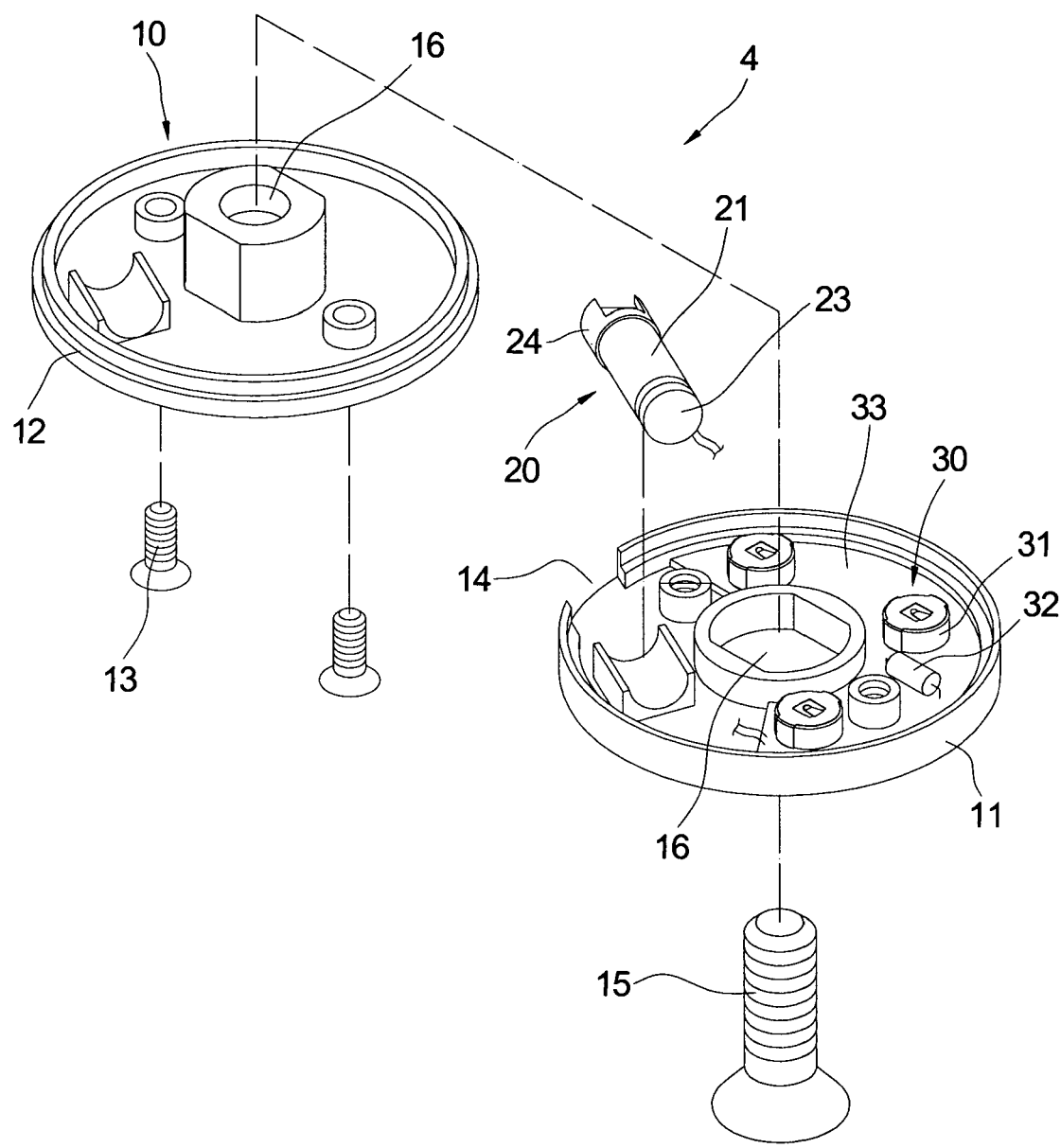
FIG. 1 is an exploded view of a laser structure for a circular saw according to the present invention.

Referring to FIG.1, a laser structure 4 is provided in a saw blade 5(FIG. 7) of the circular saw, comprising a case 10, a laser module 20, and a power control and supply unit 30. The case 10 is formed of a top cover shell 11 and a bottom cover shell 12. The top cover shell 11 and the bottom cover shell 12 are fastened together with screws 15. The case 10 has a peripheral laser hole 14 for the light from the laser module 20 passes through, and a center mounting hole 16 for mounting a screw 15 to affix the case 10 to the circular saw.

The laser module 20 and the power control and supply unit 30 are mounted inside the case 10. The power control and supply unit 30 comprises a battery set 31, a vibration switch 32, and a circuit board 33. The power control and supply unit 30 is electrically connected to the laser module 20, and adapted to drive the laser module 20 to emit laser light. The case 10 and the power control and supply unit 30 are of the known art and not within the scope of the claims of the present invention; therefore no further detailed description in this regard is necessary.

Figure 2:
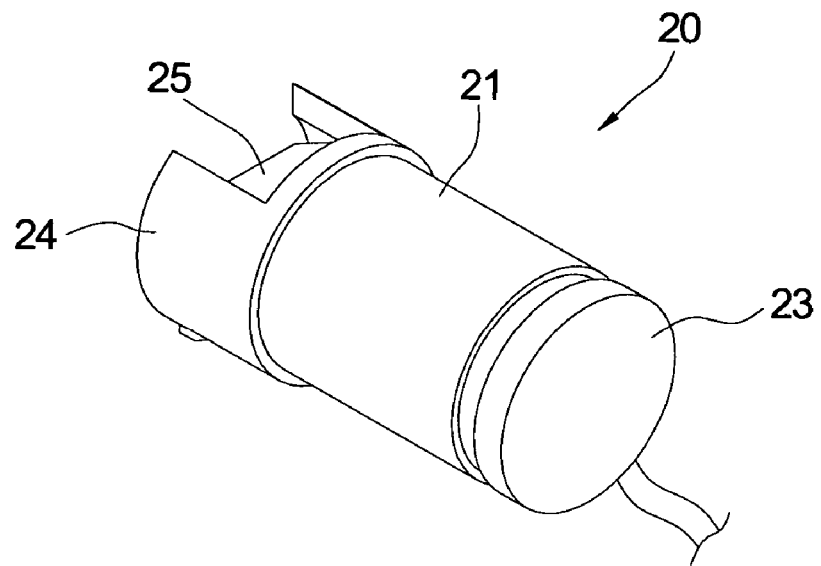
FIG. 2 is an elevational view of a laser module according to the present invention.
Figure 3:
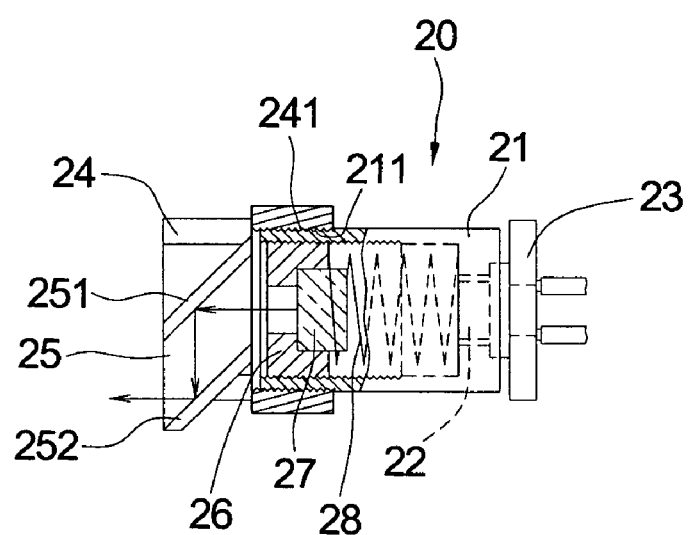
FIG. 3 is a cross-sectional view of the laser module according to the present invention.

Referring to FIG.2 and FIG. 3, the laser module 20 comprises a housing 21, a laser diode 22, a circuit board 23, a mirror holder 24, and a mirror set 25. The housing 21 is a tubular member having an outer thread 211 extended around the periphery at one end. The circuit board 23 can be a circular or rectangular circuit board mounted inside or at the rear side of the housing 21. Further, the circuit board 23 is electrically connected to the laser diode 22 and the power control and supply unit 30 and controlled by the power control and supply unit 30 to drive the laser diode 22 to emit laser light.

The housing 21 is internally mounted with an annular front endpiece 26, an focal lens 27, and a spring 28. The annular front endpiece 26 is threaded into the front end of the tubular housing 21. The focal lens 27 is a convex lens affixed to the annular front endpiece 26 in front of the laser diode 22. The spring 28 is mounted inside the housing 21 and pressed on the border area of the focal lens 27 against the annular front endpiece 26. The focal lens 27 and the laser diode 22 are axially aligned in line, and the laser diode 22 is beyond the focus of the focal lens 27. The annular front endpiece 26 can be rotated relative to the housing 21 to adjust the distance between the focal lens 27 and the laser diode 22, and therefore the focal length of the laser diode 22 is adjusted.

Figure 6:
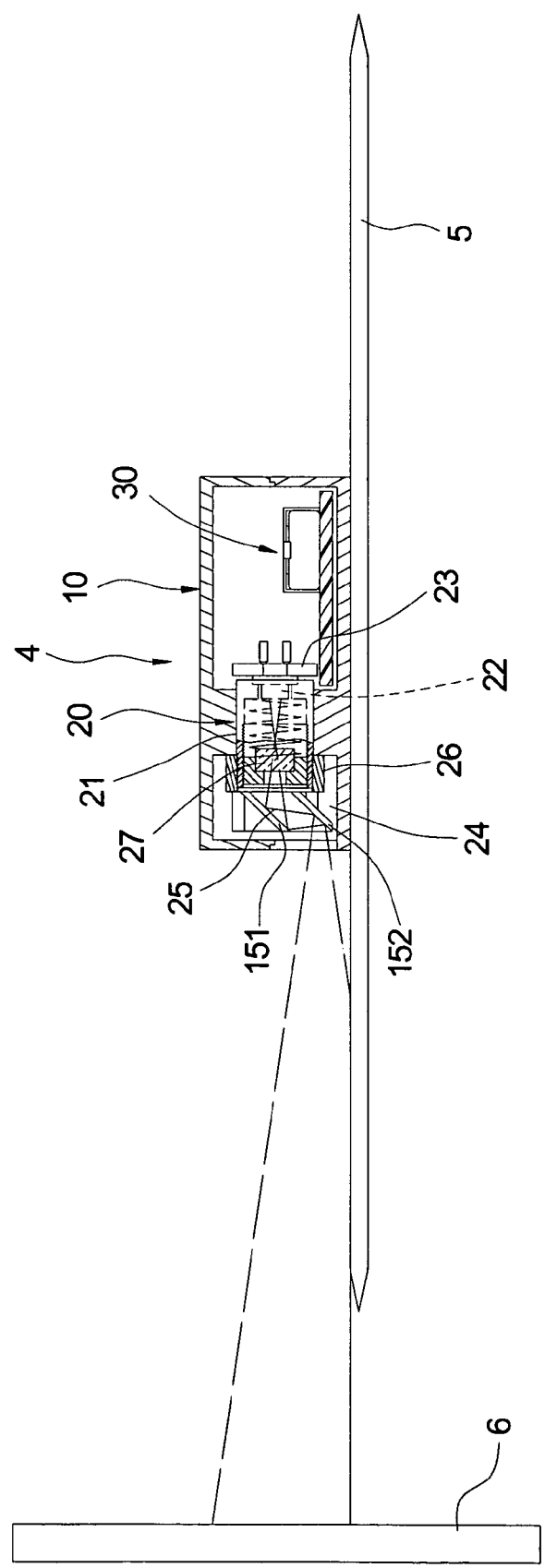
FIG. 6 is a schematic drawing showing the operation of the laser module according to the present invention.

The mirror holder 24 is a hollow cylindrical cap fastened to the front end of the housing 21, holding the mirror set 25 on the inside. The mirror set 25 comprises a first mirror 251 and a second mirror 252. The first mirror 251 and the second mirror 252 are parallel to each other and are adapted to reflect light from the laser diode 22 to let the light more closer to the saw blade 5 (FIG. 6). The mirror holder 24 has an inner thread 241. By means of threading the inner thread threaded onto the outer thread 211 of the housing 21, the mirror holder 24 is fastened to the housing 21.

Figure 4:
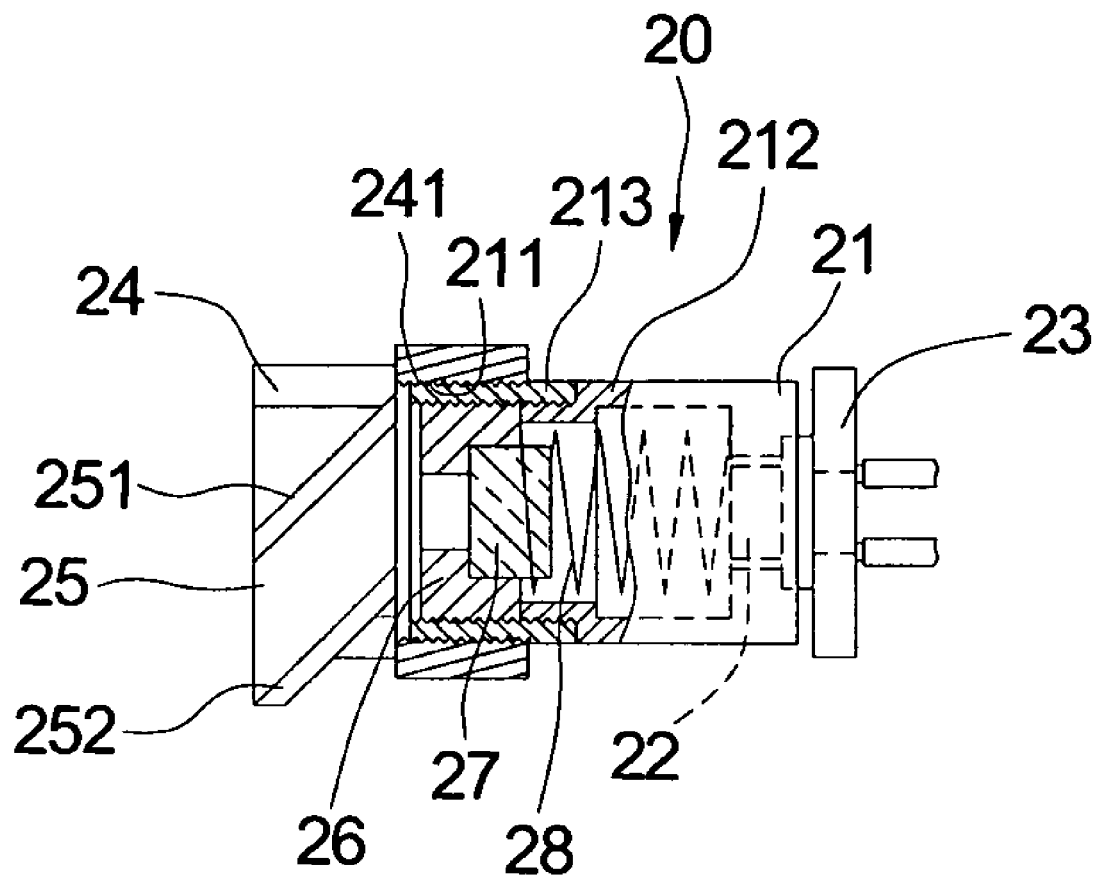
FIG. 4 is a cross-sectional view of the other embodiment of the laser module according to the present invention.
Figure 5:
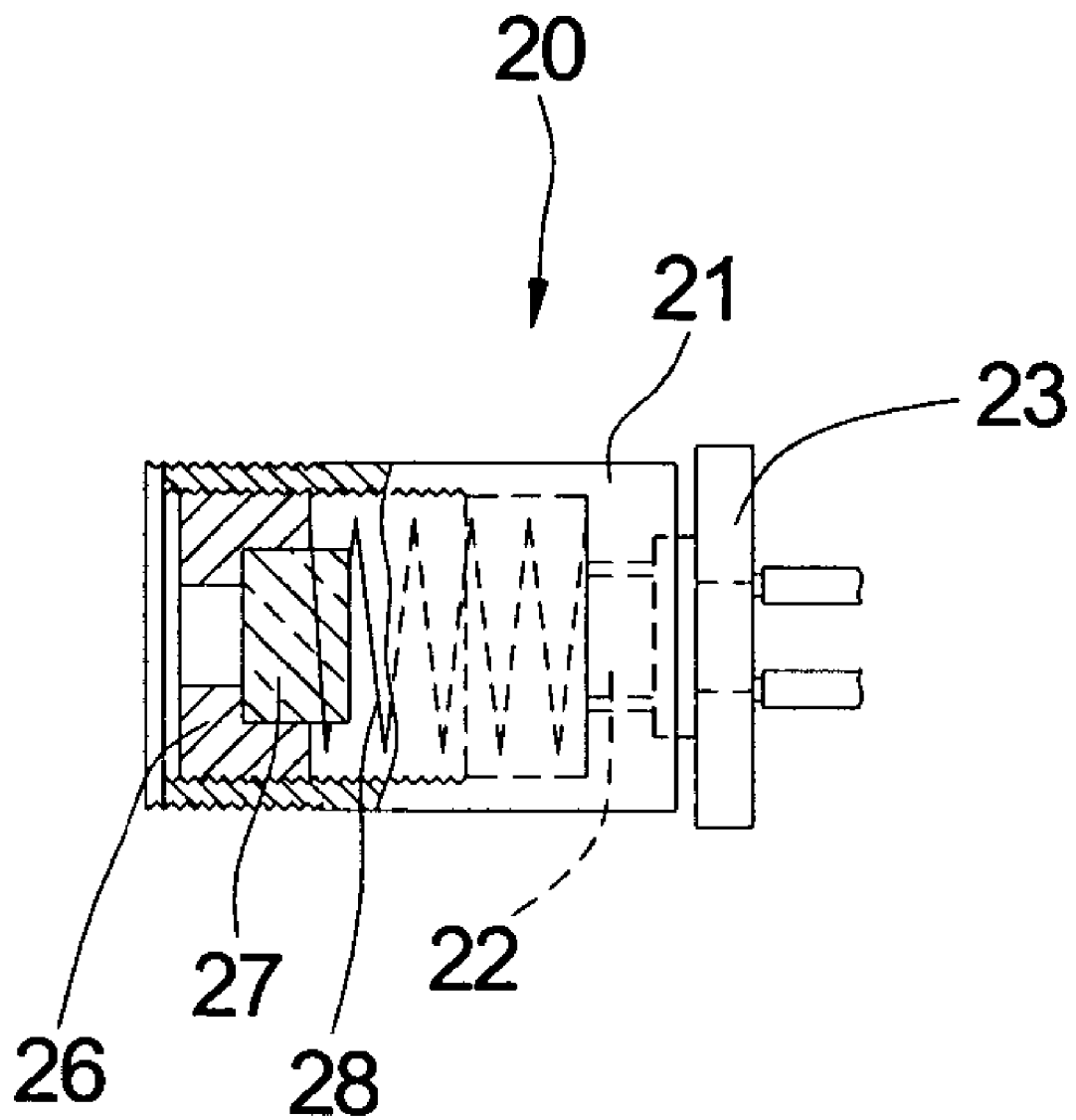
FIG. 5 is a cross-sectional view of the laser module after removal of the mirror holder and the lens.

Another embodiment, referring to FIG. 4, the housing 21 is separated into a front housing 213 and a rear housing 212. The front housing 213 screws rotatable to the rear front housing 212, and the mirror holder 24 is fastened to the front housing 213. The focal lens and the endpiece 26 mounted in the front housing 213, and the laser diode 22 and the circuit board 23 mounted in the rear housing 212. Rotating the front housing 213 relative to the rear housing 212 to adjust the distance between the focal lens 27 and the laser diode 28, and to adjust the relative position for suitable path of light when the center of the laser diode 28 is not aligned to an axis of the focal lens. In another embodiment, the endpiece 26 and the spring 28 may be canceled by the focal lens 27 being fastened in the front housing directly. If reflection of laser light is not desired, the mirror holder 24 and the mirror set 25 can be removed from the laser module 20 (see FIG. 5).

Referring to FIG. 6, during operation of the laser module 20 in the laser structure 4 on the middle of the saw blade 5, the focal lens 27 refracts the light of the laser diode 22 onto the mirror set 25, and the light is reflected by the first mirror 251 to the second mirror 252 onto the target, like workpiece 6. Because the laser diode 22 is disposed beyond the focus of the focal lens 27, laser light passing from the laser diode 22 through the focal lens 27 is slightly dispersed and some part of the light is blocked by the saw blade 5, thereby producing a laser beam. When projected onto the workpiece 6, the laser beam forms a big point of light on the workpiece. When cutting the workpiece 6 with the saw blade 5, the laser beam forms a strip of light on the workpiece 6, so that the operator can clearly see the indication of the laser light and accurately cut the workpiece with the saw disc of the circular saw subject to the indication of the laser light.

Figure 7:
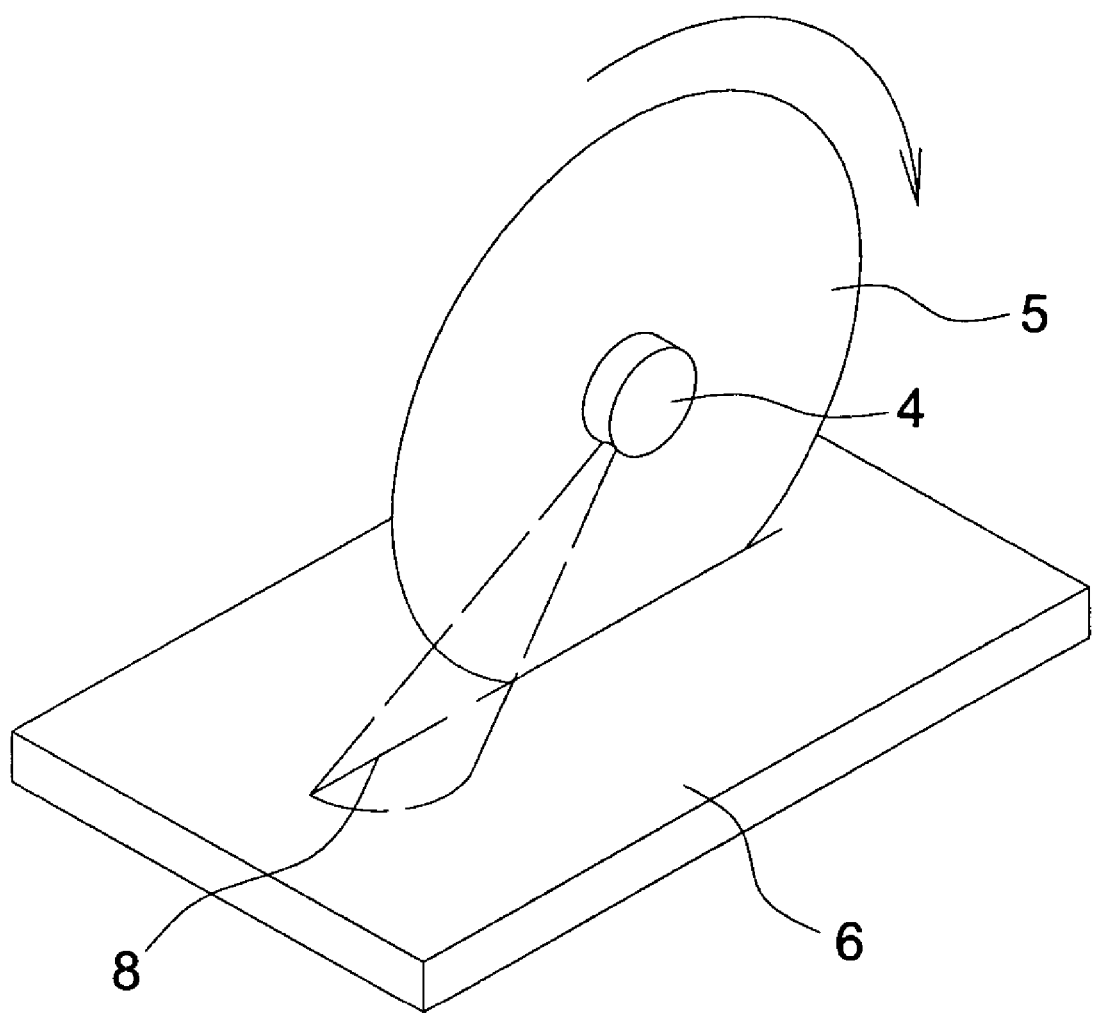
FIG. 7 is a schematic drawing showing the operation of the laser structure according to the present invention.

Referring to the FIG. 7, the laser structure 4 is provided on a middle of the saw blade 5 of the circular saw. The laser structure 4 is rotated with the rotation of the saw blade 5 during operating. The light is emitted from the laser module , which is in the laser structure 4, and some part of the light is blocked by the saw blade 5, so that a line 8 appears on the workpiece 6 for cutting accurately.

As indicated above, the laser diode 22 is set beyond the focus of the focal lens 27. The operator can adjust the distance between the focal lens 27 and the laser diode 22 to further adjust the size of the laser beam subject to different needs, for example, for illumination.

The laser beam produced by the laser module 20 can be projected along the surface of the saw blade of the circular saw (see FIG. 6) onto the workpiece, helping the operator to aim the cutting edge of the saw blade of the circular saw at the cut line made on the workpiece.

A prototype of laser module for circular saw has been constructed with the features of the annexed drawings of FIGS. 1-7. The laser module for circular saw functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A laser module used in a circular saw to guide cutting of a saw blade of the circular saw and mounted in the middle of the saw blade, the laser module comprising:
    a hollow housing;
    a laser diode mounted in said housing;
    a circuit board electrically connected to said laser diode;
    a focal lens mounted adjustably in said housing in front of said laser diode to be offset by an adjustable axial displacement therefrom, said laser diode remaining during operation beyond a focus of said focal lens;
    a mirror holder fastened to said housing;
    a pair of mirror parallel to each other and mounted inside said mirror holder for reflecting light from said focal lens and said laser diode and spaced from said focal lens at one side opposite said laser diode.

2. The laser module as claimed in claim 1, wherein said mirror holder is fastened to said housing by a screw joint.

3. The laser module as claimed in claim 1, further comprising an annular endpiece fastened to said housing by a screw joint and set in line with said laser diode to hold said focal lens in front of said laser diode and rotatable relative to said housing to adjust the distance between said focal lens and said laser diode, and a spring member mounted inside said housing to hold down said focal lens on said annular endpiece.

4. The laser module as claimed in claim 1, wherein said circuit board is fastened to a rear side of said housing remote from said focal lens.

5. The laser module as claimed in claim 1, wherein said circuit board is mounted inside said housing.

6. The laser module as claimed in claim 1, further comprising a case for fastens said housing, and said case having a laser hole for the light from the laser diode passing through.

7. The laser module as claimed in claim 6, further comprising a rotatable saw blade for the case fastened on the middle thereof, a part of light from the laser diode blocked by said saw blade.

8. A laser module used in a circular saw to guide cutting of a saw blade of the circular saw, and mounted in the middle of the saw blade, the laser module comprising:
    a hollow rear housing;
    a hollow front housing screwed the rear housing;
    a laser diode mounted in said rear housing;
    a circuit board electrically connected to said laser diode;
    a focal lens mounted adjustably in said front housing in front of said laser diode to be offset by an adjustable axial displacement therefrom by rotating said front housing, said laser diode remaining during operation beyond a focus of said focal lens;
    a mirror holder fastened to said front housing;
    a pair of mirrors parallel to each other and mounted inside said mirror holder for reflecting light from said focal lens and said laser diode and spaced from said focal lens at one side opposite said laser diode.

9. The laser module as claimed in claim 2, wherein said mirror holder is fastened to said front housing by a screw joint.

10. The laser module as claimed in claim 1, further comprising an annular endpiece fastened to said front housing by a screw joint and set in line with said laser diode to hold said focal lens in front of said laser diode and rotatable relative to said front housing to adjust the distance between said focal lens and said laser diode, and a spring member mounted inside said rear housing to hold down said focal lens on said annular endpiece.

11. The laser module as claimed in claim 1, wherein said circuit board is fastened to a rear side of said rear housing remote from said focal lens.

12. The laser module as claimed in claim 1, wherein said circuit board is mounted inside said rear housing.

13. The laser module as claimed in claim 1, further comprising a case for fastens said rear housing, and said case having a laser hole for the light from the laser diode passing through.

14. The laser module as claimed in claim 13, further comprising a rotatable saw blade for the case fastened on the middle thereof, a part of light from the laser diode blocked by said saw blade.

* * * * *